United States Patent
Huang et al.

(10) Patent No.: US 10,231,113 B1
(45) Date of Patent: Mar. 12, 2019

(54) SYSTEMS AND METHODS FOR EXTERNAL GROUP IDENTIFICATION IN WIRELESS NETWORKS

(71) Applicant: Verizon Patent and Licensing Inc., Arlington, VA (US)

(72) Inventors: Ye Huang, San Ramon, CA (US); Sudhakar Reddy Patil, Flower Mound, TX (US); Suzann Hua, Walnut Creek, CA (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/941,627

(22) Filed: Mar. 30, 2018

(51) Int. Cl.
*H04W 4/00* (2018.01)
*H04W 8/04* (2009.01)
*H04W 4/08* (2009.01)

(52) U.S. Cl.
CPC .............. *H04W 8/04* (2013.01); *H04W 4/08* (2013.01)

(58) Field of Classification Search
CPC ........... H04W 8/12; H04W 8/04; H04W 8/06; H04W 8/18; H04W 92/24
USPC ...................... 455/410–411, 415, 432.1–440, 455/456.1–456.3
See application file for complete search history.

(56) References Cited

U.S. PATENT DOCUMENTS

| | | | | |
|---|---|---|---|---|
| 2014/0369258 A1* | 12/2014 | Lin | ......................... | H04W 4/14 370/328 |
| 2015/0156624 A1* | 6/2015 | Yang | ..................... | H04W 68/00 455/411 |
| 2016/0007138 A1* | 1/2016 | Palanisanny | ............ | H04W 4/70 455/41.2 |
| 2016/0164930 A1* | 6/2016 | Hua | ...................... | H04L 65/403 370/260 |
| 2017/0013553 A1* | 1/2017 | Huang | .................. | H04W 48/08 |
| 2017/0127277 A1* | 5/2017 | Yu | ............................ | H04W 4/70 |
| 2018/0027495 A1* | 1/2018 | Song | ....................... | H04W 8/04 455/343.2 |
| 2018/0084402 A1* | 3/2018 | Kunz | ...................... | H04L 67/20 |
| 2018/0115893 A1* | 4/2018 | Lee | ....................... | H04W 12/06 |

\* cited by examiner

*Primary Examiner* — Dai Phuong (57) ABSTRACT

A computing device may include a memory configured to store instructions and a processor configured to execute the instructions to receive a request to generate a device group for a group of user equipment (UE) devices from an application server and identify a group of Home Subscriber Server (HSS) devices that store subscriber profiles for the group of UE devices. The processor may be further configured to send a request to a provisioning system to generate HSS subgroups in the group of HSS devices, with different HSS subgroups associated with different HSS devices and each HSS subgroup including at least one of the UE devices; receive, from the provisioning system, an indication that the HSS subgroups were generated; generate a mapping from the device group to the HSS subgroups; and process messages received from the application server for the device group based on the generated mapping.

20 Claims, 9 Drawing Sheets

| GROUP ID 552 | AS 554 | UE DEVICES 556 | SUBGROUP ID 562 | HSS 564 | UE DEVICES 566 |
|---|---|---|---|---|---|
| | | | ⋮ | | |

560 (braces over SUBGROUP ID, HSS, UE DEVICES columns)
550 (braces over all columns)
⋮

SYSTEMS AND METHODS FOR EXTERNAL GROUP IDENTIFICATION IN WIRELESS NETWORKS

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to take into account various communication requests associated with wireless communication devices.

DETAILED DESCRIPTION OF PREFERRED EMBODIMENTS

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. For example, an exponential growth in Internet of Things (IoT) applications leads to an increasing number of different types of UE devices employing machine-to-machine (M2M) communication, such as Machine-Type Communication (MTC). With the growing number of MTC devices, wireless access networks may need to support an increasing number of network connections. For example, each MTC device may require an Internet Protocol (IP) connection to the network in order to be able to communicate with a server device. Establishing an IP connection may require the sending and receiving of messages between devices in a wireless access network and the reservation of network resources, such as allocation of an IP address at a packet data network gateway (PGW) and establishing and maintaining a path from a base station to the PGW (referred to as a "bearer").

In order to reduce data traffic through an IP gateway and to conserve network resources, a non-IP data delivery may be implemented in a wireless access network for devices, such as MTC devices, that need to send and/or receive small amounts of data. Non-IP data delivery may be implemented, for example, using a Non-access Stratum (NAS) functional layer in a wireless access network that is used to manage the establishment of communication sessions for UE devices. Data delivery using the NAS functional layer may be referred to as Data over NAS (DoNAS) communication. DoNAS communication between UE devices and an application server may be performed using a wireless access network device configured to function as a Service Capability Exposure Function (SCEF) node.

An SCEF node may receive a message from the application server for a UE device and provide the message to a Diameter Routing Agent (DRA). The DRA routes the message to a Home Subscriber Server (HSS) that stores the subscriber profile for the UE device. The HSS device then forwards the message to a Mobility Management Entity (MME) and the MME may generate a NAS message and send the NAS message to the UE device via an eNodeB base station. Similarly, messages from the UE device sent via NAS may be received by the MME and provided to the HSS. The HSS may send the message to the DRA and the DRA may provide the message to the SCEF, which send the message to the application server.

The application server may manage device groups. For example, the application server may manage a fleet of parking meters and may need to communicate with the fleet of parking meters, such as, for example, sending an update, requesting information, and/or by performing another type of communication. The application server may request the generation of a device group and the SCEF may then forward messages to all UE devices associated with the device group based on a device group identifier (ID).

A wireless access network may include multiple HSS devices. For example, different HSS devices may be used in different geographic areas or for resilience and/or scalability reasons. When more than one HSS device is implemented in a wireless access network, all the members of a device group may need to reside in the same HSS device (i.e., the subscriber profiles for all the UE devices must be stored and/or maintained by the same HSS device). However, with the formation of device groups, different UE devices may be provisioned in different HSS devices. For example, if a device group is formed after the UE device members of the device group have been provisioned.

Implementations described herein relate to systems and methods for external group identification in a wireless access network that includes multiple HSS devices. One approach to managing device groups in a wireless access network with multiple HSS devices may be to force a user or customer to maintain information relating to which HSS device stores a subscriber profile for a particular UE device associated with the customer and/or create a group ID for UE devices associated with the same HSS device. However, such an approach shifts the burden to a user or customer, may increase the complexity of a customer's application server, and may expose network topology information to the user or customer. Another approach may include broadcasting a request from an application server to all HSS devices in the network and/or aggregating responses from all the HSS devices. However, such an approach wastes network resources and/or causes scalability issues.

Implementations described herein relate to maintaining an association between HSS devices and UE devices in an SCEF device. A computer device, configured to function as an SCEF device, may receive, from the provisioning system, an indication that subscription for a UE device has been activated. The indication may include information identifying a particular HSS device that stores a subscription profile for the UE device and the computer device may store information identifying the association between the UE device and the particular HSS device. Maintaining an association between the UE device and the particular HSS device in an SCEF device may facilitate identifying a particular HSS device for each UE device, and facilitate management of UE device groups and reduce the use of network resource in managing the UE device groups.

Implementation described herein further relate to using the stored association between HSS devices and UE devices to manage device groups. The computer device may receive a request to generate a device group for a group of UE devices from an application server associated with the group of UE devices. In some implementations, the UE devices may correspond to IoT devices configured to communicate with the application server using DoNAS communication. In other implementations, the UE device may correspond to different types of devices.

The computer device may identify a group of HSS devices that store subscriber profiles for UE devices in the group of UE devices and send a request to a provisioning system to generate different HSS subgroups in different HSS devices in the group of HSS devices. Each HSS subgroup may include at least one UE device from the device group. For example, an HSS subgroup in a particular HSS device may include the UE devices from the device group for which the particular HSS device stores subscriber profiles. The computer device may receive an indication from the provisioning system that the HSS subgroups were generated and, in response, generate a mapping from the device group to the HSS subgroups.

The computer device may then process messages received from the application server for the device group based on the generated mapping. For example, the computer device may receive a request from the application server for the generated device group, generate a group of HSS subgroup requests based on the generated mapping, and send the generated group of HSS subgroup requests to the HSS devices via a DRA device. The computer device may then receive a group of HSS subgroup answers via the DRA device based on the sent HSS subgroup requests, generate an answer based on the received HSS subgroup answers, and send the generated answer to the application server.

Furthermore, the computer device may be configured so that one or more of the UE devices in the device group is, associated with a first HSS device that has been reassigned to a second HSS device, and update the generated mapping based on determining that the one or more UE devices have been reassigned to the second HSS device. Moreover, the computer device may be configured to receive a request to add a new UE device to the device group or to remove an existing UE device from the device group, identify a particular HSS device associated with the new UE device or existing UE device, and update the generated mapping based on the received request and the identified particular HSS device.

In some implementations, identifying the HSS devices that store subscriber profiles for the UE devices may include identifying a particular HSS device as storing a subscriber profile for a particular UE device based on at least one of a geographic location, wireless access network, or device type associated with the particular UE device.

Figure 1:
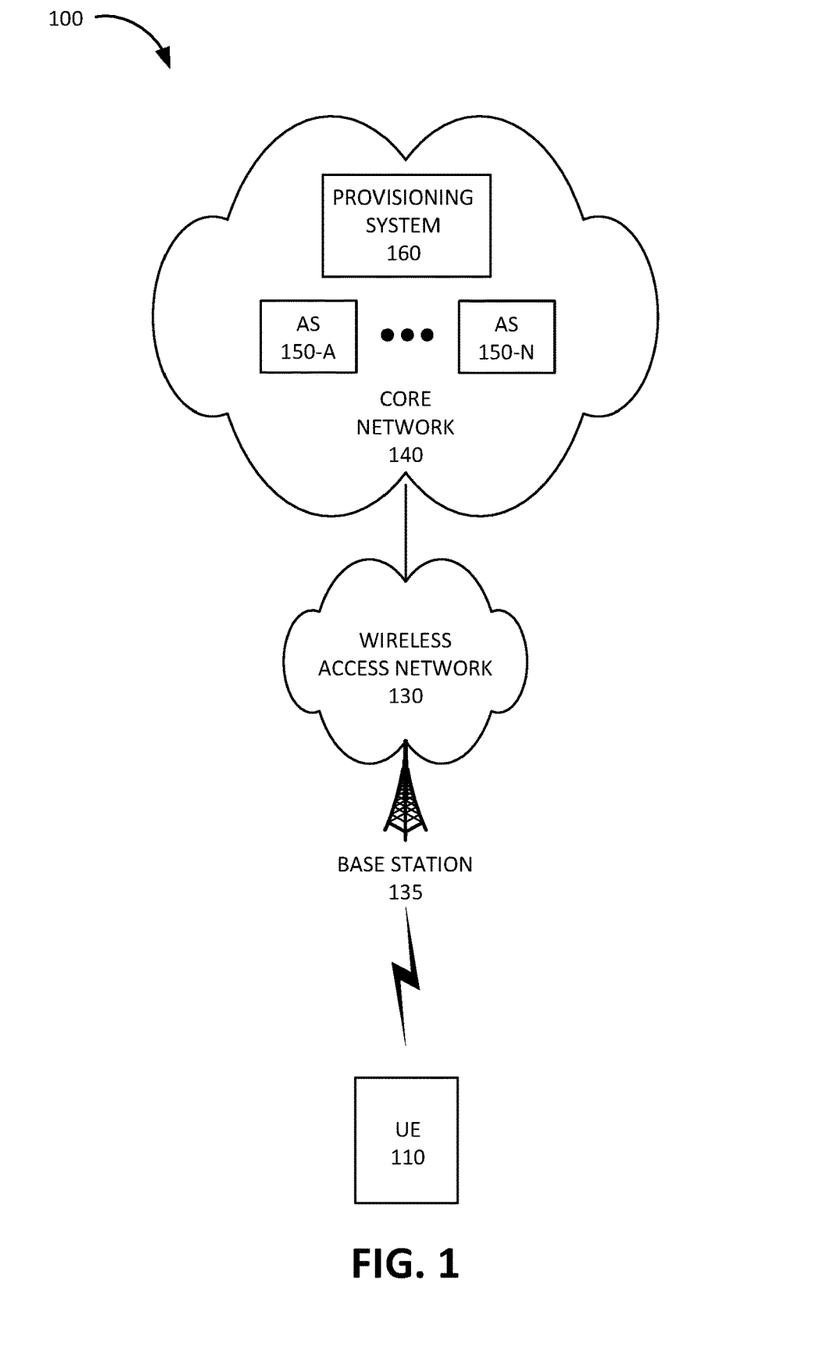
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include a UE device 110, a wireless access network 130, and a core network 140.

UE device 110 may correspond to an embedded wireless MTC device that communicates wirelessly with other devices over a machine-to-machine (M2M) interface. For example, UE device 110 may be coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones, aerostats, or other aerial devices.

In yet other implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

Wireless access network 130 may provide access to core network 140 for wireless devices, such as UE device 110. Wireless access network 130 may enable UE device 110 to connect to core network 140 for mobile telephone service, Short Message Service (SMS) message service, Multimedia Message Service (MMS) message service, Internet access, cloud computing, and/or other types of data services. Wireless access network 130 may include a base station 135 and UE device 110 may wirelessly communicate with wireless access network 130 via base station 135. Wireless access network 130 may establish a packet data network connection between UE device 110 and core network 140 via one or more Access Point Names (APNs). For example, wireless access network 130 may establish an Internet Protocol (IP) connection between UE device 110 and core network 140.

In some implementations, wireless access network 130 may include a Long Term Evolution (LTE) access network (e.g., an evolved packet core (EPC) network). In other implementations, wireless access network 130 may include a Code Division Multiple Access (CDMA) access network. For example, the CDMA access network may include a CDMA enhanced High Rate Packet Data (eHRPD) network (which may provide access to an LTE access network).

Furthermore, wireless access network 130 may include an LTE Advanced (LTE-A) access network and/or a Fifth Generation (5G) access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an Internet Protocol Multimedia Subsystem (IMS) network (not shown in FIG. 1). An IMS network may include a network for delivering IP multimedia services and may provide media flows between UE device 110 and external IP networks or external circuit-switched networks (not shown in FIG. 1). Core network 140 may include application servers (AS's) 150-A to 150-N (referred to herein individually as "AS 150" and collectively as "AS's 150") and a provisioning system 160.

AS 150 may include one or more devices, such as computer devices and/or server devices, which receive uplink data from UE device 110 and/or which send downlink data to UE device 110. For example, AS 150 may be configured to collect sensor data from UE device 110, to receive reports from UE device 110, such as error reports and/or health status reports, to receive billing information from UE device 110, to receive location information from UE device 110, to receive requests for instructions from UE device 110, to receive requests for updates from UE device 110, and/or to receive other types of information from UE device 110. Additionally or alternatively, AS 150 may be configured to send sensor data to UE device 110, to send control instructions to an actuator associated with UE device 110, to send updates to UE device 110, to send instructions to perform particular actions by UE device 110, to send authentication information to UE device 110, to send a query for a particular type of information to UE device 110, and/or to send other types of data and/or instructions to UE device 110.

Provisioning system 160 may include one or more devices, such as computer devices and/or server devices, which provision services for UE devices 110. For example, provisioning system 160 may execute a series of provisioning steps to enable a particular service for a particular subscriber line on a particular UE device 110. The provisioning steps may include provisioning system 160 generating an instruction and sending the instruction to a particular network device (not shown in FIG. 1), such as a routing device (e.g., a router, a switch, a firewall, a getaway, etc.), a wireless access network device (e.g., a base station, an MME, a Serving Gateway (SGW), a Packet Data Network Gateway (PGW), an HSS, an SCEF, a DRA, etc.), an IMS device (e.g., an Application Server (AS), a Call Session Control Function (CSCF) device, etc.), a messaging server (e.g., an SMS server, an MIMS server, an Instant Messaging (IM) server, a voicemail server, etc.), an authentication server (e.g., a Diameter server, an Authentication, Authorization, and Accounting (AAA) server), etc.), an update server (e.g., an Over-the-air (OTA) server), and/or another type of network device.

Provisioning system 160 may activate UE device 110, based on receiving a request from AS 150, and select a particular HSS to store the subscriber profile for UE device 110. Provisioning system 160 may further send an indication to an SCEF to inform the SCEF that UE device 110 has been activated and may provide information identifying the HSS associated with UE device 110. Moreover, provisioning system 160 may create a device group in an HSS and may provide information relating to a created device group to a DRA and/or to an SCEF.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
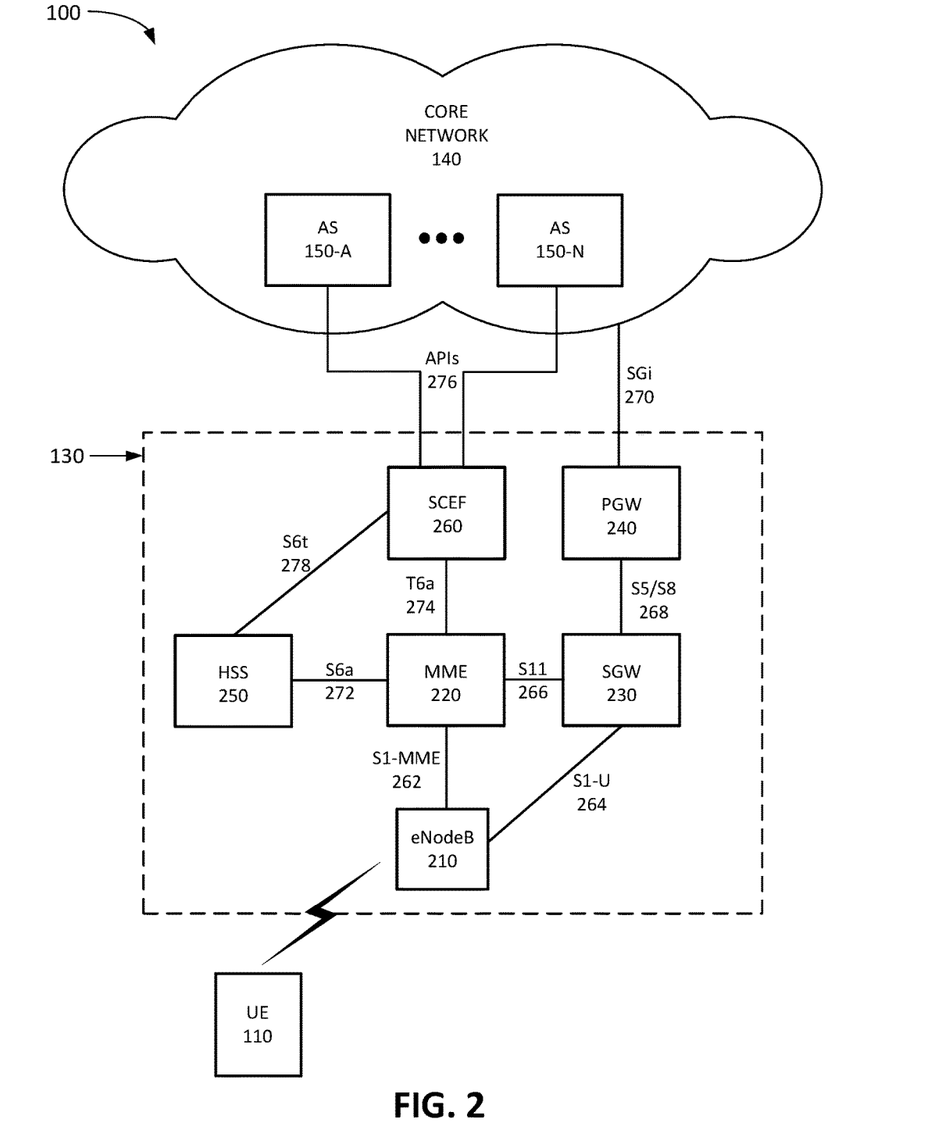
FIG. 2 is a diagram illustrating exemplary components of the access network of FIG. 1.

FIG. 2 is a diagram illustrating exemplary components of wireless access network 130 in the context of environment 100 according to an implementation described herein. As shown in FIG. 2, wireless access network 130 may include eNodeB 210 (corresponding to base station 135), an MME 220, an SGW 230, a PGW 240, an HSS 250, and an SCEF 260. While FIG. 2 depicts a single eNodeB 210, MME 220, SGW 230, PGW 240, HSS 250, and SCEF 260 for illustration purposes, in practice, FIG. 2 may include multiple eNodeBs 210, MMEs 220, SGWs 230, PGWs 240, HSS 250, and SCEFs 260.

eNodeB 210 may include one or more devices (e.g., base stations) and other components and functionality that allow UE device 110 to wirelessly connect to wireless access network 130 (e.g., base station 135). eNodeB 210 may include or be associated with one or more cells. For example, each cell may include a radio frequency (RF) transceiver facing a particular direction. eNodeB 210 may interface with wireless access network 130 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a NAS protocol and/or Stream Control Transmission Protocol (SCTP). An S1-U interface 264 may interface with SGW 230 and may be implemented, for example, using GTPv2.

MME 220 may implement control plane processing for wireless access network 130. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMEs 220 in wireless access network 130 and may send and receive information associated with UE devices 110, which may allow one MME 220 to take over control plane processing of UE devices serviced by another MME 220, if the other MME 220 becomes unavailable. Furthermore, MME 220 may manage non-IP communication with UE 110 using NAS.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to provider network 240 through an SGi interface 270. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to wireless access network 130, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include information identifying UE device 110, authentication and/or authorization information for UE device 110, services enabled and/or authorized for UE device 110, device group membership information for UE device 110, and/or other types of information associated with UE device 110. MME 220 may communicate with HSS 250 through an S6a interface 272. S6a interface 272 may be implemented, for example, using a Diameter protocol.

SCEF 260 may function as an interface between AS 150 and UE device 110 for non-IP data delivery. Thus, SCEF 260 may expose the services and/or capabilities of AS 150 to UE devices 110. SCEF 260 may communicate with AS 150 via an Application Programming Interface (API) 276. MME 220 may communicate with SCEF 260 through a T6a interface 274 via a DRA (not shown in FIG. 2). T6a interface 274 may be implemented, for example, using a Diameter protocol. SCEF 260 may maintain information associating UE device 110 with a particular HSS 250 that stores the subscriber profile for UE device 110. Furthermore, SCEF 260 may manage device groups and may request generation of HSS subgroups for device groups and may generate a mapping between a device group and corresponding HSS subgroups.

Although FIG. 2 shows exemplary components of wireless access network 130, in other implementations, wireless access network 130 may include fewer components, different components, differently arranged components, or additional components than depicted in FIG. 2. Additionally or alternatively, one or more components of wireless access network 130 may perform functions described as being performed by one or more other components of wireless access network 130.

Figure 3:
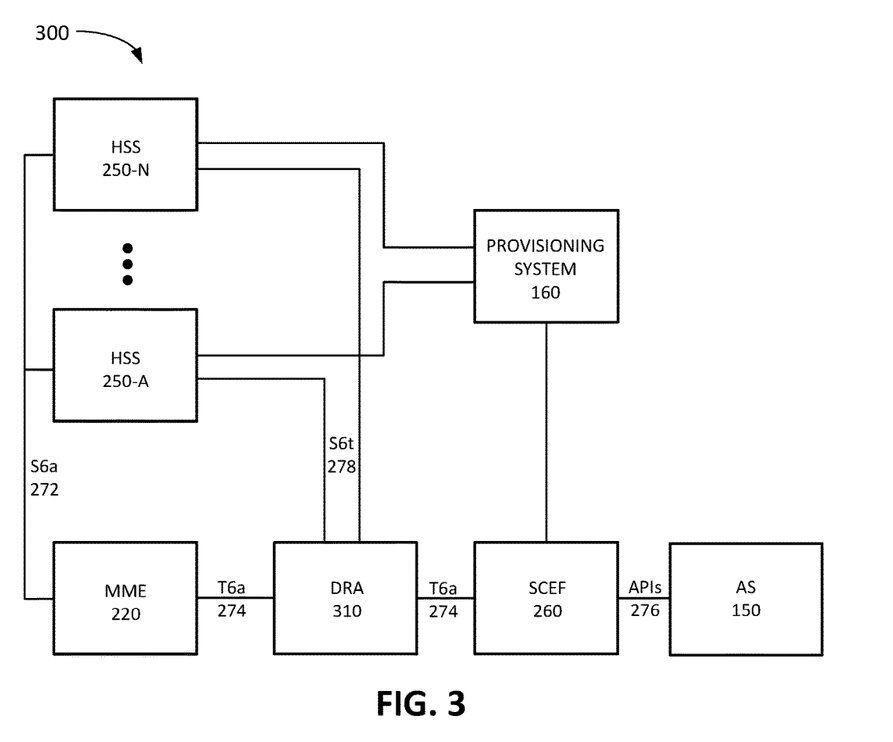
FIG. 3 is a diagram illustrating an exemplary configuration of the access network of FIG. 2.

FIG. 3 is a diagram illustrating an exemplary configuration 300 of wireless access network 130. As shown in FIG. 3, configuration 300 may include MME 220, a DRA 310, SCEF 260, AS 150, provisioning system 160, and HSS devices 250-A to 250-N. SCEF 260 may communicate with AS 150, provisioning system 160, and DRA 310. DRA 310 may route Diameter messages in wireless access network 130. Thus, DRA 310 may interface SCEF 260 with MME 220 and with HSS devices 250-A to 250-N. Each HSS device 250 may store subscriber profiles for a set of UE devices 110. In some implementations, different HSS devices 250 may be associated with different geographic areas, with different wireless access networks 130, and/or different types of UE devices 110. Additionally or alternatively, HSS devices 250 may be deployed for load balancing and/or resilience purposes and UE devices 110 may be distributed among HSS devices 250 by provisioning system 160.

Thus, when a request to activate a new UE device 110 is received by the provider, provisioning system 160 may select a particular HSS 250 and may instruct the selected HSS 250 to store the subscriber profile for the new UE device 110. Provisioning system 160 may then send information to SCEF 260 indicating which HSS 250 has been assigned to the new UE device 110 and SCEF 260 may record the information. SCEF 260 may manage device groups based on device groups generated by AS 150 and may send messages intended for a particular device group to UE devices 110 that are members of the device group. SCEF 260 may request that provisioning system 160 create HSS subgroups for a device group for each HSS 250 that stores subscriber profiles for UE devices 110 that are members of the device group. SCEF 260 may then create a mapping from the device group to the HSS subgroups and may send messages intended for the device group to the HSS subgroups via DRA 310. Furthermore, SCEF 260 may receive messages from HSS subgroups and may map the messages onto the device group and forward the messages to AS 150 as messages associated with the device group.

Although FIG. 3 shows exemplary components of configuration 300, in other implementations, configuration 300 may include fewer components, different components, differently arranged components, or additional components than depicted in FIG. 3. Additionally or alternatively, one or more components of configuration 300 may perform functions described as being performed by one or more other components of configuration 300.

Figure 4:
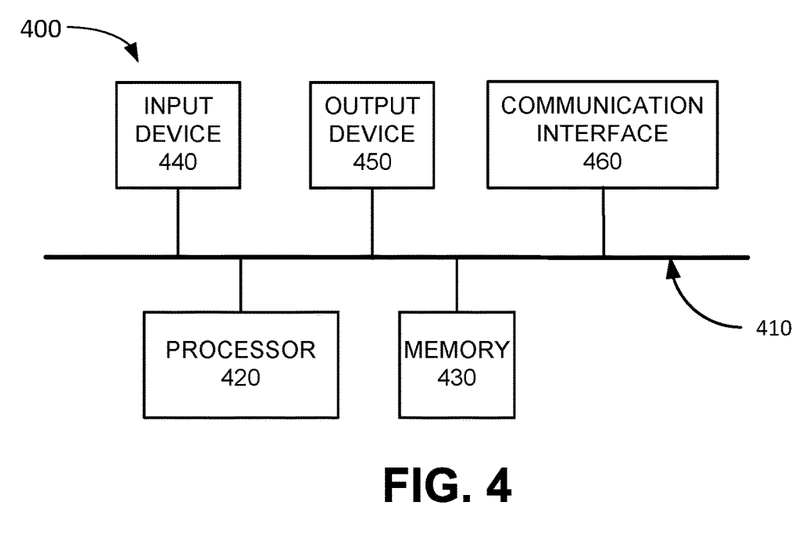
FIG. 4 is a diagram illustrating exemplary components of a device that may be included in a device of FIG. 1, FIG. 2, and/or FIG. 3.

FIG. 4 is a diagram illustrating example components of a device 400 according to an implementation described herein. UE device 110, eNodeB 210, MME 220, SGW 230, PGW 240, HSS 250. SCEF 260, DRA 310, and/or AS 150 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to the operation of an SCEF device (e.g., SCEF 260). Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400.

Figure 5:
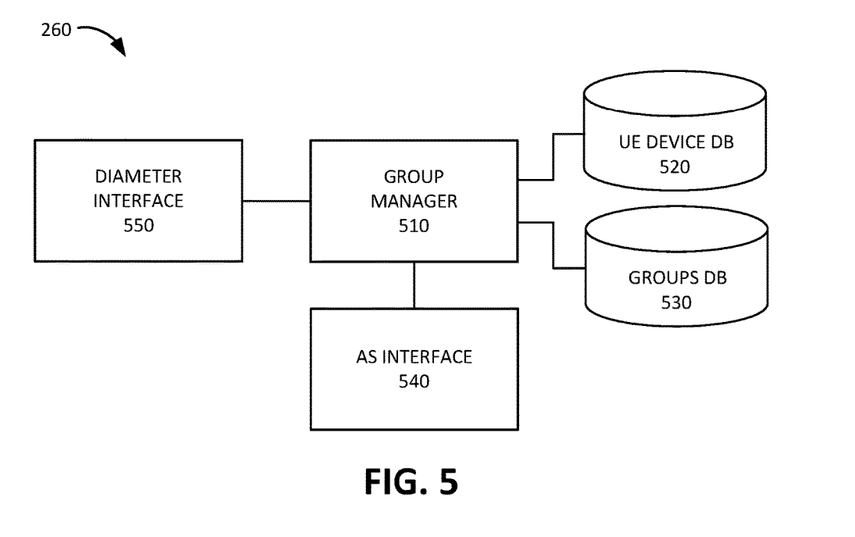
FIG. 5 is a diagram illustrating exemplary functional components of the Service Capability Exposure Function device of FIG. 2.

FIG. 5 is a diagram illustrating exemplary functional components of SCEF 260. The functional components of SCEF 260 may be implemented, for example, via processor 420 executing instructions from memory 430. Alternatively, some or all of the functional components included in SCEF 260 may be implemented via hard-wired circuitry. As shown in FIG. 5, SCEF 260 may include a group manager 510, a UE device database (DB) 520, a groups DB 530, an AS interface 540, and a Diameter interface 550.

Group manager 510 may manage device groups associated with AS 150. For example, group manager 510 may receive information from provisioning system 160 associating a particular UE device 110 with a particular HSS device 250 and may store the association between UE devices 110 and HSS devices 250 in UE device DB 520. Thus, UE device DB 520 may store information associating particular UE devices 110 with a particular HSS device 250.

Furthermore, group manager 510 may generate a device group in response to receiving a request from AS 150 to generate the device group. Group manager 510 may store information relating to the device group in groups DB 530. Exemplary information that may be stored in groups DB 530 is described below with reference to FIG. 6. Group manager 510 may identify HSS devices 250 that store subscriber profiles for UE devices 110 that are included in the device group and may send a request to provisioning system 160 to create an HSS subgroup in each identified HSS device 250. Each HSS subgroup, associated with a particular HSS device 250, may include UE devices 110 that are members of the device group and that have subscriber profiles stored by the particular HSS device 250. Group manager 510 may then generate a mapping from the device group to the HSS subgroups and may use the mapping to process messages between AS 150 and UE devices 110 in the device group.

AS interface 540 may be configured to communicate with AS 150 using APIs 276. For example, AS interface 540 may receive a message from AS 150 via an API associated with AS 150 for a particular device group and/or may send a message from a UE device 110 associated with a device group to AS 150 using the API.

Diameter interface 550 may be configured to send and receive Diameter messages. Diameter interface 550 may communicate with DRA 310. As an example, Diameter interface 550 may receive Diameter protocol messages from MME 220 via DRA 310 using the T6a interface 274 and may send Diameter protocol messages to MME 220 via DRA 310 using T6a interface 274. As another example, Diameter interface 550 may receive Diameter protocol messages from HSS 250 via DRA 310 using S6t interface 278 and may send Diameter protocol messages to HSS 250 via DRA 310 using S6t interface 278.

Although FIG. 5 shows exemplary components of SCEF 260, in other implementations, SCEF 260 may include fewer components, different components, additional components, or differently arranged components than depicted in FIG. 5. Additionally or alternatively, one or more components of SCEF 260 may perform one or more tasks described as being performed by one or more other components of SCEF 260.

Figure 6:
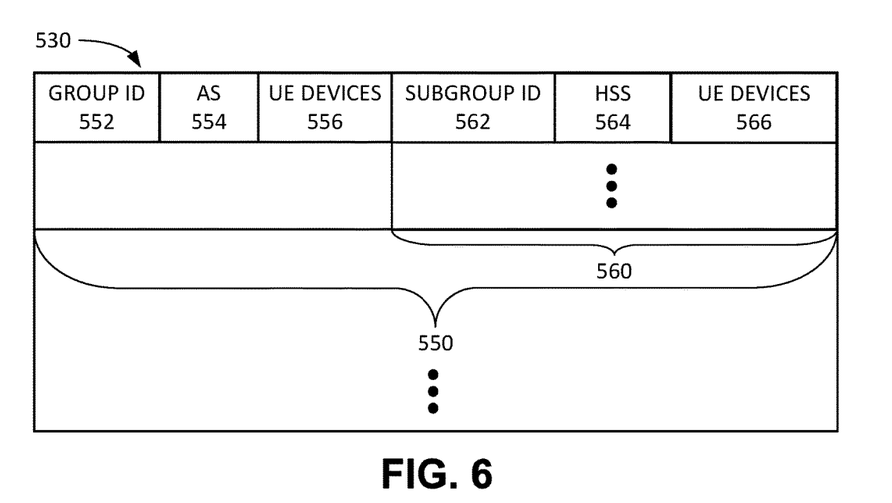
FIG. 6 is a diagram illustrating exemplary components of the groups database of FIG. 5.

FIG. 6 is a diagram illustrating exemplary components of groups DB 530. As shown in FIG. 6, groups DB 530 may include one or more device group records 550. Each device group record 550 may store information relating to a particular device group. Device group record 550 may include a group ID field 552, an AS field 554, a UE devices field 556, and one or more HSS subgroup fields 560.

Group ID field 552 may include an ID that uniquely identifies a particular device group managed by SCEF 260. Furthermore, in some implementations, group ID field 552 may include additional information, such as information identifying a particular time period during which the particular device group is valid and/or active, information identifying a category associated with the particular device group, information identifying one or more triggering conditions that may determine whether the status of particular device group should change (e.g., from valid to invalid or vice versa, from active to inactive or vice versa, etc.), and/or other types of information relating to the particular device group.

AS field 554 may include information identifying a particular AS 150 associated with the particular device group. For example, AS field 554 may store a short code associated with the particular AS 150 that may be included in a message from UE device 110, an access point name (APN) associated with the particular AS 150, an Internet Protocol (IP) address associated with the particular AS 150, a descriptive name associated with the particular AS 150, and/or another type of AS identifier.

UE devices field 556 may include information identifying UE devices 110 that are members of the particular device group. For example, for each particular UE device 110 that is a member of the device group, UE devices field 556 may include a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of ID associated with the particular UE device 110.

Each HSS subgroup field 560 may store information relating to a particular HSS subgroup associated with the particular device group. HSS subgroup field 560 may include a subgroup ID field 562, an HSS field 564, and a UE devices field 566. Subgroup ID field 562 may include an ID that uniquely identifies a particular HSS subgroup. HSS field 564 may store information identifying a particular HSS device 250 associated with the particular HSS subgroup. For example, HSS Field 564 may store an IP address, a Diameter Identity, a Uniform Resource Identifier (URI), a descriptive name, and/or another type of ID associated with the particular HSS device 250. UE devices field 566 may store information identifying those of UE devices 110 identified in UE devices field 556 that are associated with the particular HSS device 250. In other words, UE devices field 566 may identify UE devices 110 that are members of the device group and for which the particular HSS device 250 stores subscriber profiles.

Although FIG. 6 shows exemplary components of groups DB 530, in other implementations, groups DB 530 may include fewer components, different components, additional components, or differently arranged components than depicted in FIG. 6.

Figure 7:
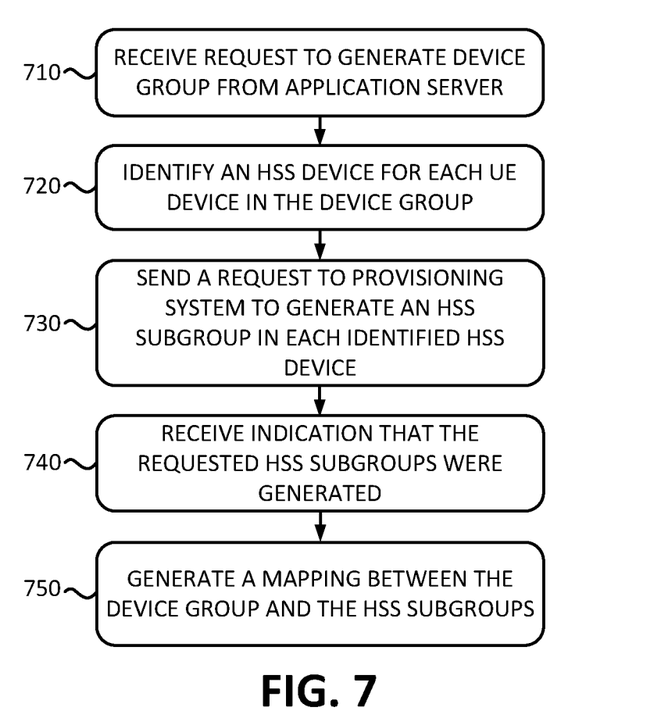
FIG. 7 is a flowchart of a process for creating an external group in a wireless access network according to an implementation described herein.

FIG. 7 is a flowchart of creating an external group in a wireless access network according to an implementation described herein. In some implementations, the process of FIG. 7 may be performed by SCEF 260. In other implementations, some or all of the process of FIG. 7 may be performed by another device or a group of devices separate from SCEF 260, such as one or more other components of wireless access network 130.

The process of FIG. 7 may include receiving a request to generate a device group from AS 150 (block 710). For example, AS 150 may send a request to SCEF 260 to create a device group for a set of UE devices 110 associated with AS 150. The request may include the list of UE devices 110 that are to be members of the device group.

SCEF 260 may identify a particular HSS device 250 for each UE device 110 in the device group (block 720) and send a request to provisioning system 160 to generate an HSS subgroup in each identified HSS device 250 (block 730). For example, group manager 510 may access UE device DB 520 and may identify, for each UE device 110 listed in the request, a particular HSS device 250 associated with the UE device 110. Group manager 510 may then send a request for each HSS subgroup to provisioning system 160 to create a device group in each of the identified HSS devices 250 for UE devices 110 associated with each of the identified HSS devices 250 that are members of the device group.

SCEF 260 may receive an indication that the requested HSS subgroups were generated (block 740) and generate a mapping between the device group and the HSS subgroups (block 750). For example, provisioning system 160 may respond with a confirmation that the requested device groups were generated in each of the identified HSS devices 250. Based on receiving the confirmation, group manager 510 may generate a device group record 550 in groups DB 530 for the new device group and may generate an HSS subgroup field 560 for each identified HSS device 250. Group manager 510 may further store, in each HSS subgroup field 560, information identifying UE devices 110 associated with the HSS device 250 associated with the HSS subgroup.

Group manager 510 may monitor the device group and update the device group if the group membership changes or if the HSS devices 250 associated with the device group change. As an example, group manager 510 may receive an indication, from provisioning system 160 and/or DRA 310 that a particular HSS device 250 has become unavailable or that one or more UE devices 110 in the device group have been reassigned to a different HSS device 250. In response, group manager 510 may update the mapping by updating device group record 550 associated with the device group. As another example, group manager 510 may receive a request to add a new UE device 110 to the device group or to remove an existing member UE device 110 from the device group. In response, group manager 510 may update the group membership and may update a particular HSS subgroup associated with the new UE device 110 to be added or the existing member UE device 110 to be removed.

Figure 8:
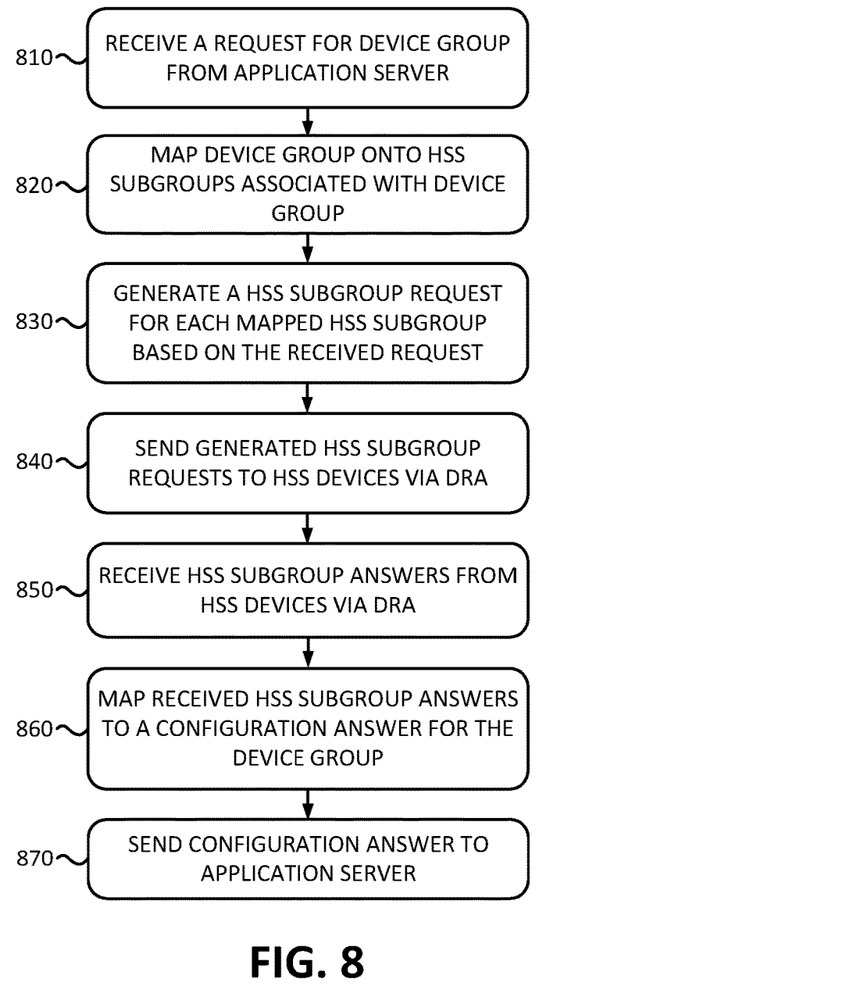
FIG. 8 is a flowchart of processing messages for an external group in a wireless access network according to an implementation described herein.

FIG. 8 is a flowchart of processing messages for an external group in a wireless access network according to an implementation described herein. In some implementations, the process of FIG. 8 may be performed by SCEF 260. In other implementations, some or all of the process of FIG. 8 may be performed by another device or a group of devices separate from SCEF 260, such as another component of wireless access network 130.

The process of FIG. 8 may include receiving a request for a device group from AS 150 (810). For example, AS interface 540 may receive a request that includes downlink data for UE devices 110 in a device group. The downlink data may include, for example, a request for a report, such as an error report and/or health status report, a request for authentication information, a request for billing information, a request for location information, a request to perform an update, a request to store a particular piece of information, a request to activate a sensor and/or actuator, a request to perform a particular function, and/or another type of request.

The device group may be mapped into HSS subgroups associated with the device group (block 820), an HSS subgroup request may be generated for each mapped HSS subgroup based on the received request (block 830), and the generated HSS subgroup requests may be sent to HSS devices 250 via DRA 310 (block 840). For example, group manager 510 may generate an HSS subgroup request for each HSS subgroup identified in the device group record 550 associated with the device group, may include the downlink data from the received request in each generated HSS subgroup request, and may send each generated HSS subgroup request to the corresponding HSS device 250 via DRA 310.

HSS subgroup answers may be received from HSS devices 250 via DRA 310 (block 850), mapped to an answer for the device group (block 860), and the device group answer may be sent to AS 150 (block 870). For example, Diameter interface 550 may receive an answer from each HSS device 250, via DRA 310, indicating that the downlink data included in the HSS subgroup request has been sent to the UE devices 110 associated with the HSS subgroup, and may generate an answer that is sent to AS 150, indicating that the request has been successfully delivered to UE devices 110 in the device group.

Figure 9:
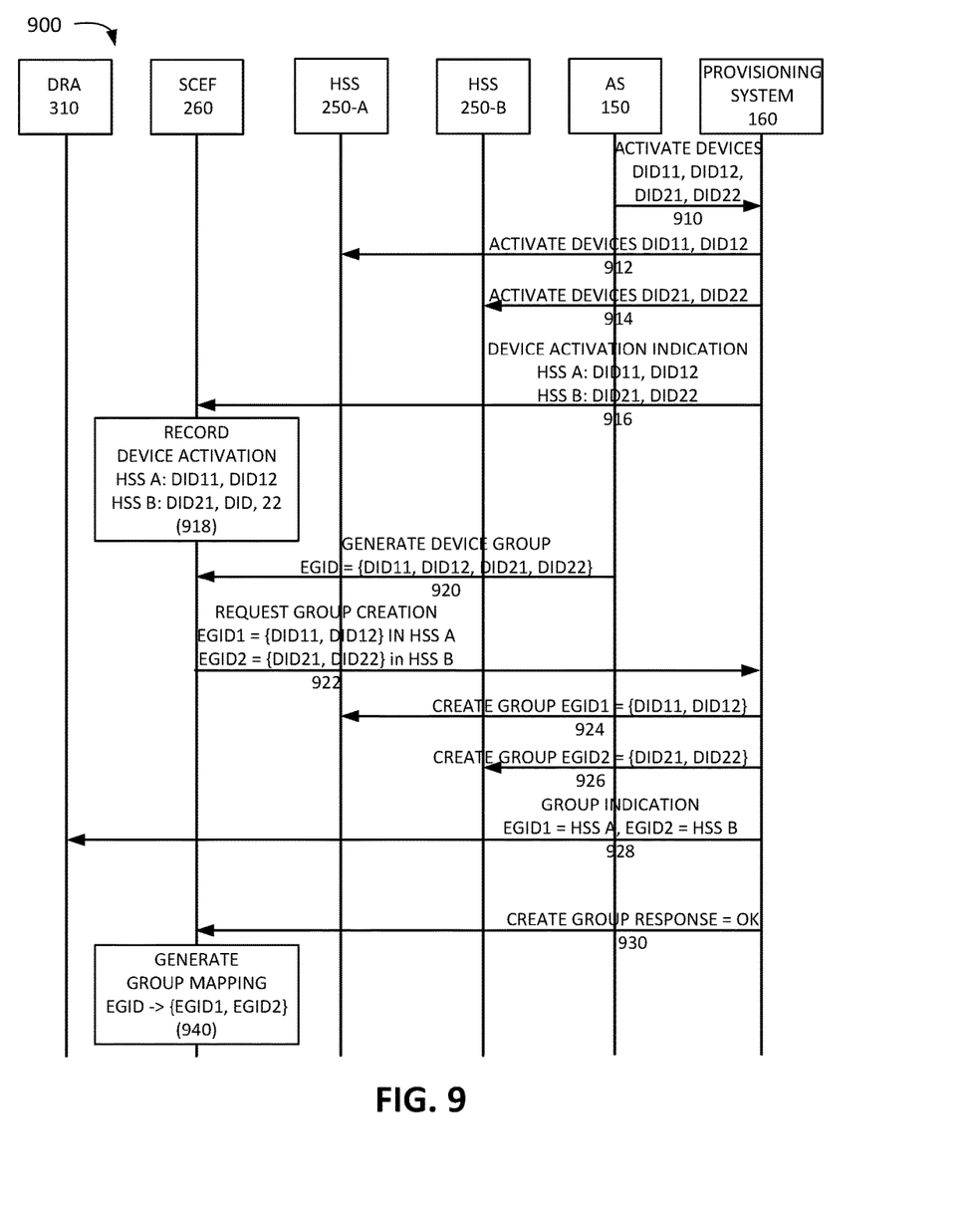
FIG. 9 is an exemplary signal flow of creating an external group in a wireless access network according to an implementation described herein.

FIG. 9 is an exemplary signal flow 900 associated with creating an external group that includes four devices with device IDs (DIDs) DID11, DID12, DID 21, and DID 22. Signal flow 900 may include AS 150 sending a request to provisioning system 160 to activate UE devices 110 DID11, DID12, DID21, and DID22 (signal 910). In response, provisioning system 160 may select HSS device 250 for each of the UE devices 110. For example, provisioning system 160 may activate devices DID11 and DID12 by instructing HSS device 250-A to store and activate subscriber profiles for devices DID11 and DID12 (signal 912). Similarly, provisioning system 160 may activate devices DID21 and DID22 by instructing HSS device 250-B to store and activate subscriber profiles for devices DID21 and DID22 (signal 914). Provisioning system 160 may further send an indication to SCEF 260 that the devices have been activated and that DID and DID are associated with HSS device 250-A and that DID21 and DID22 are associated with HSS device 250-B (signal 916) and SCEF 260 may store the association (block 918).

At a later time, AS 150 may create a device group for UE devices 110 DID11, DID12, DID21, and DID22 with an external group ID (EGID) and may send a request to SCEF 260 to generate a device group with DID11, DID12, DID21, and DID22 as members (signal 920). SCEF 260 may identify DID11 and DID12 as associated with HSS device 250-A and may send a group creation request to provisioning system 160 to create an HSS subgroup EGID1 in HSS device 250-A for DID11 and DID12, and may identify DID21 and DID22 as associated with HSS device 250-B and may send a group creation request to provisioning system 160 to create an HSS subgroup EGID2 in HSS device 250-B for DID21 and DID22 (signal 922).

In response, provisioning system 160 may create a first HSS subgroup EGID1 in HSS 250-A with members DID11 and DID12 (signal 924) and may create a second HSS subgroup EGID2 in HSS 250-B with members DID21 and DID22 (signal 926). Provisioning system 160 may provide information relating to the created croups to DRA 310 so that DRA 310 is able to correctly route messages associated with the HSS subgroups (signal 928). Provisioning system 160 may then send a create group response back to SCEF 260, indicating that the HSS subgroups were successfully created (signal 930). SCEF 260 may then generate a mapping from the device group EGID to HSS subgroups EGID1 and EGID2.

Figure 10:
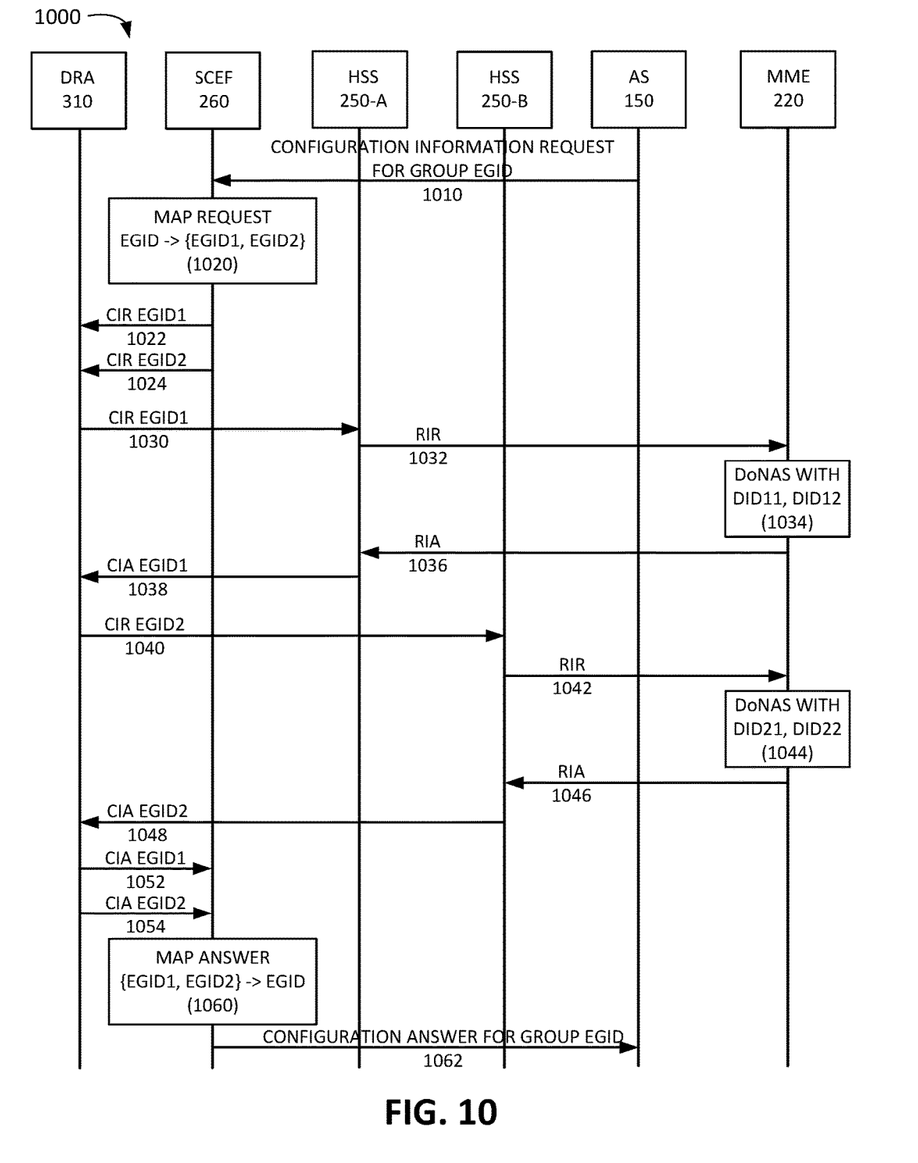
FIG. 10 is an exemplary signal flow of processing messages for an external group in a wireless access network according to an implementation described herein.

FIG. 10 is an exemplary signal flow 1000 of processing messages for external group EGID described in FIG. 9. Signal flow 1000 may include AS 150 sending a configuration information request (CIR) with downlink data to SCEF 260 for device group EGID (signal flow 1010). SCEF 260 may map the CIR request from EGID to HSS subgroups EGID1 and EGID2 (block 1020). SCEF 260 may then send a first CIR for EGID to HSS device 250-A via DRA 310 (signal 1022) and a second CIR for EGID2 to HSS device 250-B via DRA 310 (signal 1024).

DRA 310 may forward the CIR for EGID1 to HSS device 250-A (signal 1030) and HSS device 250-A may send a Report Information Request (RIR) to MME 220 for each UE device 110 in EGID1, namely DID11 and DID12. MME 220 may perform DoNAS message delivery to DID11 and DID12 and may receive confirmation from DID11 and DID12 that the RIR have been successfully delivered (block 1034). In response, MME 220 may send a Report Information Answer (MA) back to HSS device 250-A (signal 1036) and HSS device 250-A may send a Confirmation Information Answer (CIA) for EGID1 back to DRA 310 (signal 1038).

Similarly, and possibly substantially simultaneously with sending signal 1030, DRA 310 may forward the CIR for EGID2 to HSS device 250-B (signal 1040) and HSS device 250-B may send a RIR to MME 220 for each UE device 110 in EGID2, namely DID21 and DID22. MME 220 may perform DoNAS message delivery to DID21 and DID22 and may receive confirmation from DID21 and DID22 that the RIR have been successfully delivered (block 1044). In response, MME 220 may send a RIA back to HSS device 250-B (signal 1046) and HSS device 250-A may send a CIA for EGID2 back to DRA 310 (signal 1048). DRA 310 may forward a CIA for EGID to SCEF 260 (signal 1052) and may forward a CIA for EGID2 to SCEF 260 (signal 1054). SCEF 260 may map the CIAs for EGID and EGID2 to a CIA for EGID (block 1060) and may send the CIA for EGID to AS 150 (signal 1062).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7 and 8, and series of signal flows have been described with respect to FIGS. 9 and 10, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device, a request to generate a device group for a plurality of user equipment (UE) devices from an application server associated with the plurality of UE devices;
   identifying, by the computer device, a plurality of Home Subscriber Server (HSS) devices that store subscriber profiles for particular ones of the plurality of UE devices;
   sending, by the computer device, a request to a provisioning system to generate a plurality of HSS subgroups in the plurality of HSS devices, wherein different HSS subgroups, of the plurality of HSS subgroups, are associated with different ones of the plurality of HSS devices, and wherein each HSS subgroup, of the plurality of HSS subgroups, includes at least one of the plurality of UE devices;
   receiving, by the computer device and from the provisioning system, an indication that the HSS subgroups were generated;
   generating, by the computer device, a mapping from the device group to the HSS subgroups; and
   processing, by the computer device, messages received from the application server for the device group based on the generated mapping.

2. The method of claim 1, further comprising:
   receiving, from the provisioning system, an indication that a subscription for a particular one of the plurality of UE devices has been activated, wherein the indication includes information identifying a particular HSS device that stores a subscription profile for the particular one of the plurality of UE devices.

3. The method of claim 1, wherein the request identifies, for a particular HSS subgroup, of the plurality of HSS subgroups, a particular HSS device, of the plurality of HSS devices, and one or more UE devices, of the plurality of UE devices, for which the particular HSS device stores subscriber profiles.

4. The method of claim 1, wherein processing messages received from the application server for the device group based on the generated mapping includes:

receiving a request from the application server for the generated device group;
generating a plurality of HSS subgroup requests based on the generated mapping;
sending the generated plurality of HSS subgroup requests to the plurality of HSS devices via a Diameter routing agent (DRA) device;
receiving a plurality of HSS subgroup answers via the DRA device based on the sent plurality of HSS subgroups requests;
generating an answer based on the received plurality of HSS subgroup answers; and
sending the generated answer to the application server.

5. The method of claim 1, wherein identifying the plurality of HSS devices that store subscriber profiles for particular ones of the plurality of UE devices includes:
identifying a particular HSS device as storing a subscriber profile for a particular UE device based on at least one of a geographic location, wireless access network, or device type associated with the particular UE device.

6. The method of claim 1, further comprising:
determining that one or more UE devices, of the plurality of UE devices, associated with a first HSS device have been reassigned to a second HSS device; and
updating the generated mapping based on determining that the one or more UE devices have been reassigned to the second HSS device.

7. The method of claim 1, further comprising:
receiving a request to add a new UE device to the device group or to remove an existing UE device from the device group;
identifying a particular HSS device associated with the new UE device or existing UE device; and
updating the generated mapping based on the received request to add the new UE device or to remove the existing UE device and the identified particular HSS device.

8. The method of claim 1, wherein the computer device includes a Service Capability Exposure Function (SCEF) device.

9. The method of claim 1, wherein the plurality of UE devices include Internet of Things (IoT) devices configured to communicate with the application server using Data Over Non-Access Stratum (DoNAS) communication.

10. A computer device comprising:
a memory configured to store instructions; and
a processor configured to execute the instructions to:
receive a request to generate a device group for a plurality of user equipment (UE) devices from an application server associated with the plurality of UE devices;
identify a plurality of Home Subscriber Server (HSS) devices that store subscriber profiles for particular ones of the plurality of UE devices;
send a request to a provisioning system to generate a plurality of HSS subgroups in the plurality of HSS devices, wherein different HSS subgroups, of the plurality of HSS subgroups, are associated with different ones of the plurality of HSS devices, and wherein each HSS subgroup, of the plurality of HSS subgroups, includes at least one of the plurality of UE devices;
receive, from the provisioning system, an indication that the HSS subgroups were generated;
generate a mapping from the device group to the HSS subgroups; and
process messages received from the application server for the device group based on the generated mapping.

11. The computer device of claim 10, wherein the processor is further configured to:
receive, from the provisioning system, an indication that a subscription for a particular one of the plurality of UE devices has been activated, wherein the indication includes information identifying a particular HSS device that stores a subscription profile for the particular one of the plurality of UE devices.

12. The computer device of claim 10, wherein the request identifies, for a particular HSS subgroup, of the plurality of HSS subgroups, a particular HSS device, of the plurality of HSS devices, and one or more UE devices, of the plurality of UE devices, for which the particular HSS device stores subscriber profiles.

13. The computer device of claim 10, wherein, when processing messages received from the application server for the device group based on the generated mapping, the processor is further configured to:
receive a request from the application server for the generated device group;
generate a plurality of HSS subgroup requests based on the generated mapping;
send the generated plurality of HSS subgroup requests to the plurality of HSS devices via a Diameter routing agent (DRA) device;
receive a plurality of HSS subgroup answers via the DRA device based on the sent plurality of HSS subgroups requests;
generate an answer based on the received plurality of HSS subgroup answers; and
send the generated answer to the application server.

14. The computer device of claim 10, wherein, when identifying the plurality of HSS devices that store subscriber profiles for particular ones of the plurality of UE devices, the processor is further configured to:
identify a particular HSS device as storing a subscriber profile for a particular UE device based on at least one of a geographic location, wireless access network, or device type associated with the particular UE device.

15. The computer device of claim 10, wherein the processor is further configured to:
determine that one or more UE devices, of the plurality of UE devices, associated with a first HSS device have been reassigned to a second HSS device; and
update the generated mapping based on determining that the one or more UE devices have been reassigned to the second HSS device.

16. The computer device of claim 10, wherein the processor is further configured to:
receive a request to add a new UE device to the device group or to remove an existing UE device from the device group;
identify a particular HSS device associated with the new UE device or existing UE device; and
update the generated mapping based on the received request to add the new UE device or to remove the existing UE device and the identified particular HSS device.

17. The computer device of claim 10, wherein the computer device includes a Service Capability Exposure Function (SCEF) device.

18. The computer device of claim 10, wherein the plurality of UE devices include Internet of Things (IoT) devices configured to communicate with the application server using Data Over Non-Access Stratum (DoNAS) communication.

19. A non-transitory computer-readable memory device storing instructions executable by a processor, the non-transitory computer-readable memory device comprising:
one or more instructions to receive a request to generate a device group for a plurality of user equipment (UE) devices from an application server associated with the plurality of UE devices;
one or more instructions to identify a plurality of Home Subscriber Server (HSS) devices that store subscriber profiles for particular ones of the plurality of UE devices;
one or more instructions to send a request to a provisioning system to generate a plurality of HSS subgroups in the plurality of HSS devices, wherein different HSS subgroups, of the plurality of HSS subgroups, are associated with different ones of the plurality of HSS devices, and wherein each HSS subgroup, of the plurality of HSS subgroups, includes at least one of the plurality of UE devices;
one or more instructions to receive, from the provisioning system, an indication that the HSS subgroups were generated;
one or more instructions to generate a mapping from the device group to the HSS subgroups; and
one or more instructions to process messages received from the application server for the device group based on the generated mapping.

20. The non-transitory computer-readable memory device of claim 19, wherein the one or more instructions to process messages received from the application server for the device group based on the generated mapping further include:
one or more instructions to receive a request from the application server for the generated device group;
one or more instructions to generate a plurality of HSS subgroup requests based on the generated mapping;
one or more instructions to send the generated plurality of HSS subgroup requests to the plurality of HSS devices via a Diameter routing agent (DRA) device;
one or more instructions to receive a plurality of HSS subgroup answers via the DRA device based on the sent plurality of HSS subgroups requests;
one or more instructions to generate an answer based on the received plurality of HSS subgroup answers; and
one or more instructions to send the generated answer to the application server.

* * * * *